United States Patent [19]

Beun et al.

[11] 3,753,229

[45] Aug. 14, 1973

[54] METHOD OF AND DEVICE FOR THE REMOVAL OF SHORT PROJECTING STROKE ELEMENTS OF CHARACTERS

[76] Inventors: Matthijs Beun; Pieter Reinjnierse, both of Emmasingel, Eindhoven, Netherlands

[22] Filed: Nov. 9, 1971

[21] Appl. No.: 196,988

[30] Foreign Application Priority Data

Nov. 12, 1970 Netherlands ........................ 7016538

[52] U.S. Cl. ...............340/146.3 MA, 340/146.3 H

[51] Int. Cl. ........................................G06k 9/12

[58] Field of Search .................................. 340/146.3

[56] References Cited

UNITED STATES PATENTS 3,609,685 9/1971 Deutsch...................... 340/146.3 AE

FOREIGN PATENTS OR APPLICATIONS 1,106,974 3/1968 Great Britain ............... 340/146.3 H

*Primary Examiner*—Daryl W. Cook
*Assistant Examiner*—Leo H. Boudreau
*Attorney*—Frank R. Trifari

[57] ABSTRACT

A method and system for skeletonizing characters in a character recognition technique. The junctions and the end points of a skeleton character are known. Series of character positions which start too close to a junction are removed. The length can be defined as the number of character positions in a series or as the number of character positions of the shortest possible series which connects the end point of a series to the first junction of that series. The procedure may be started by searching for end points, or by searching for junctions and subsequently for the end points situated nearby.

3 Claims, 8 Drawing Figures

INVENTORS
MATTHIJS BEUN
PIETER REIJNIERSE

BY
Frank R. Trifari
AGENT

| | $R_T$ | $R_A$ | | | $P_T$ | $P_A$ | | | |
|---|---|---|---|---|---|---|---|---|---|
| 1 | 1 | 0 | 0 | 1 | – | 0 | 0 | 0 | |
| 2 | 0 | 0 | 0 | 1 | 1 | 0 | 0 | 1 | |
| 3 | 0 | 0 | 0 | 1 | 0 | 0 | 0 | 1 | |
| 4 | 1 | 0 | 0 | 1 | 0 | 0 | 0 | 1 | $C_1$ |
| 5 | 1 | 0 | 0 | 1 | – | 0 | 0 | 0 | |
| 6 | – | 0 | 0 | 0 | 1 | 0 | 1 | 0 | |
| 7 | 1 | 0 | 1 | 0 | – | 0 | 0 | 0 | |
| 8 | – | 0 | 0 | 0 | 0 | 0 | 1 | 0 | |
| 9 | 1 | 0 | 1 | 1 | 1 | 0 | 0 | 1 | |
| 10 | 0 | 0 | 1 | 0 | 1 | 0 | 1 | 0 | |
| 11 | 0 | 0 | 1 | 0 | 0 | 0 | 1 | 0 | |
| 12 | 1 | 0 | 1 | 0 | 0 | 0 | 1 | 0 | |
| 13 | 1 | 0 | 0 | 1 | – | 0 | 0 | 0 | |
| 14 | 1 | 0 | 0 | 1 | 1 | 0 | 0 | 1 | |
| 15 | – | 0 | 0 | 0 | 1 | 0 | 1 | 0 | |
| 16 | 0 | 0 | 0 | 1 | 1 | 0 | 0 | 1 | $C_2$ |
| 17 | 0 | 0 | 1 | 0 | – | 0 | 0 | 0 | |
| 18 | 0 | 0 | 0 | 1 | 0 | 0 | 0 | 1 | |
| 19 | – | 0 | 0 | 0 | 0 | 0 | 1 | 0 | |
| 20 | 1 | 0 | 0 | 1 | 0 | 0 | 0 | 1 | |
| 21 | 1 | 0 | 1 | 1 | – | 0 | 0 | 0 | |
| 22 | – | 0 | 0 | 0 | 1 | 1 | 0 | 0 | |
| 23 | 0 | 1 | 0 | 0 | – | 0 | 0 | 0 | |
| 24 | – | 0 | 0 | 0 | 0 | 1 | 0 | 0 | |
| 25 | 1 | 0 | 1 | 0 | 0 | 0 | 0 | 1 | |
| 26 | 1 | 0 | 1 | 1 | 1 | 0 | 1 | 1 | |
| 27 | 0 | 0 | 1 | 1 | 1 | 0 | 1 | 1 | |
| 28 | 0 | 0 | 1 | 1 | 0 | 0 | 1 | 1 | |
| 29 | – | 0 | 0 | 0 | 0 | 0 | 0 | 1 | |
| 30 | 1 | 0 | 1 | 0 | 0 | 0 | 1 | 0 | |
| 31 | 1 | 0 | 1 | 0 | – | 0 | 0 | 0 | |
| 32 | 1 | 0 | 1 | 0 | 1 | 0 | 1 | 0 | |
| 33 | – | 0 | 0 | 0 | 1 | 0 | 1 | 0 | |
| 34 | 0 | 0 | 1 | 0 | 1 | 0 | 1 | 0 | |
| 35 | 0 | 0 | 1 | 0 | – | 0 | 0 | 0 | |
| 36 | 0 | 0 | 1 | 0 | 0 | 0 | 1 | 0 | |
| 37 | – | 0 | 0 | 0 | 0 | 0 | 1 | 1 | $C_3$ |
| 38 | 1 | 0 | 0 | 1 | 0 | 0 | 0 | 1 | |
| 39 | 1 | 1 | 0 | 0 | – | 0 | 0 | 0 | |
| 40 | 1 | 0 | 0 | 1 | 1 | 0 | 0 | 1 | |
| 41 | – | 0 | 0 | 0 | 1 | 1 | 0 | 0 | |
| 42 | 0 | 0 | 0 | 1 | 1 | 0 | 0 | 1 | |
| 43 | 0 | 1 | 0 | 0 | – | 0 | 0 | 0 | |
| 44 | 0 | 0 | 0 | 1 | 0 | 0 | 0 | 1 | |
| 45 | – | 0 | 0 | 0 | 0 | 1 | 0 | 1 | |
| 46 | 1 | 1 | 1 | 0 | – | 0 | 0 | 0 | |
| 47 | – | 0 | 0 | 0 | 1 | 1 | 1 | 0 | |
| 48 | 0 | 1 | 1 | 0 | – | 0 | 0 | 0 | |

Fig.5

INVENTORS
MATTHIJS BEUN
PIETER REIJNIERSE
BY
Frank R. Trifari
AGENT

INVENTORS
MATTHIJS BEUN
PIETER REIJNIERSE
BY
AGENT

Patented Aug. 14, 1973 3,753,229

4 Sheets-Sheet 4

*INVENTORS*
MATTHIJS BEUN
PIETER REIJNIERSE

*BY* [signature]

AGENT

METHOD OF AND DEVICE FOR THE REMOVAL OF SHORT PROJECTING STROKE ELEMENTS OF CHARACTERS

The invention relates to a method of removing short projecting stroke elements of characters which are imaged on a two-dimensional regular pattern of positions, a character position being distinguished from a background position by digital information present, at least that information of said characters which determines which character positions are associated with the associated skeleton characters being present, the stroke elements of said skeleton characters consisting of single series of character positions which succeed each other in accordance with an adjacency criterion, additional information being provided for said character positions which indicates whether said character positions are end points, connection points or junctions. This method is used in character recognition. It has been observed that characters can often be readily recognized merely on the basis of said skeleton characters, as much redundant information has then been removed, whilst sufficient characteristics are still present to guarantee correct recognition. It may be that skeletonizing is overdone so that the skeleton character misses essential characteristics, for example, in that stroke elements are interrupted or are even missing altogether. If skeletonizing is less extensive, sometimes redundant strokes and/or short stroke elements remain. In order to remove these short stroke elements in the said latter case, and thus obtain very well usable skeleton characters, the invention is characterized in that of a series of character positions starting from a junction at least one series is removed if the spanlength of that series, measured as a number of positions from its end point to a junction, does not exceed a given value, it being possible for said junction to change into a connection point, after which said additional information of the original junction is changed accordingly.

A preferred embodiment of the method according to the invention is characterized in that said span length is measured according to the shortest possible connection which might apply in accordance with said adjacency criterion, so that more weight is not attached to curved series than to straight series having the same distance between the end and the next junction.

Another preferred embodiment according to the invention is characterized in that said span length is measured by counting the number of successive character positions of said series. Simple procedures are known for counting such successive character positions.

Another preferred embodiment according to the invention is characterized in that after detection of an end point the character positions of the series terminating in that end point can be removed until a junction is reached, provided that the said span length has not been exceeded until then. This method can be readily performed, while virtually always all redundant projecting stroke elements are removed.

An extension of this method is characterized in that said removal is effected in a number of rounds, the span length being increased by at least one position in each subsequent round. For example, during a first round all projecting stroke elements of, for example, one character span length can be removed, upon the next round those of two character positions, etc. For example, it is possible that from a three-stroke junction two short stroke elements start having a span length of one and of three character positions, respectively. If the end point of the longest span length were first detected, it could be removed, so that the three-stroke junction would become a connection point. In that case the shortest span length would unduly remain. This is avoided by the described embodiment of the invention.

Another method according to the invention is characterized in that after detection of a junction the positions near the position of that junction are interrogated, starting from the position of the junction it being possible, after detection of an end point, to remove the series of which that end point forms part by successively removing character positions, provided that said span length is not exceeded. Consequently, starting from a junction, all projecting stroke elements which are too short are removed, i.e., starting with the shortest stroke element if the positions near and starting from the junction are interrogated.

The invention also relates to a device for removing, in accordance with the foregoing, short projecting stroke elements of characters which are imaged on a two-dimensional regular pattern of positions, a character position being distinguished from a background position by digital information present, additional information being present for said character positions which indicates whether said character positions are end points, connection points, or junctions, said information being stored in a store from which the information can be transferred to a treatment device. In order to be able to remove the stroke element from the end point of a projecting redundant stroke element, the invention is characterized in that the treatment device comprises a detector which can be adjusted, by means of an adjusting signal, to detecting end points, connection points and junctions, respectively, and which supplies, upon detection of the kind of point for which a search is made, an equality signal under the control of which a provided control unit interrogates the information of a number of positions, it being possible for said number to be zero, during at least one search series, it being possible to isolate the information of an end point during a search series of a first kind by storing information in an isolation store, it being possible to isolate the information of a connection point during a search series of a second kind by storing information in said isolation store, said second search series being started in that said control unit receives an equality signal during a search series of said first kind, s span length defining unit being provided which is incorporated in said isolation store and which has a capacity which is measured in a number of character positions, said defining unit supplying a signal to said control unit when the span length of a series of character positions to be found is reached in order to prevent the starting of a subsequent search series of said second kind. In this respect, a search series of the first kind is a search cycle for an end point whose information is isolated, whilst in each search series of the second kind the information of a connection point can be isolated.

A preferred embodiment of a device according to the invention is characterized in that said span length defining unit defines an area comprising a number of positions around a central position, the number of positions in a series which starts in said central position and which terminates at a position giving a limit of said area, always being at least equal to said span length. Consequently, no more weight is attached to curved series of character positions than to straight ones having the same distance between the end and the first junction.

Another preferred embodiment of a device according to the invention is characterized in that said span length defining unit comprises a counter which counts the number of character positions from which information has been isolated, said counter applying a signal to said control unit when a given position is reached which corresponds to a span length, in order to prevent the starting of a next search series of said second kind. The construction of the span length defining unit is made very simple when a counter of this kind is included.

In order that the invention may be readily carried into effect, some embodiments thereof will now be described in detail, by way of example, with reference to the accompanying diagrammatic drawings, in which:

FIG. 5 shows a number of kinds of stored information for controlling the sequence of interrogation of FIG. 3;

Figure 1:
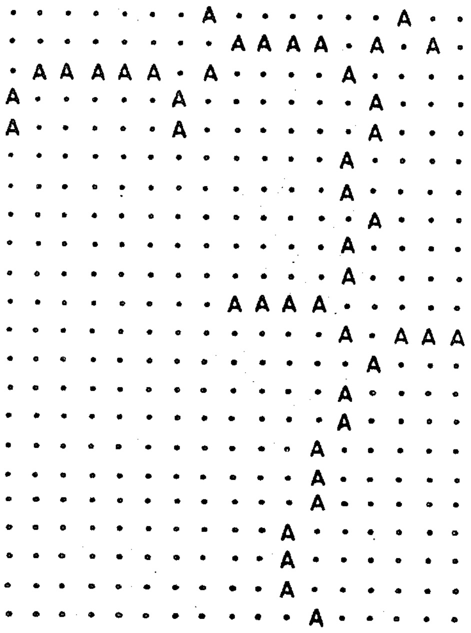
FIG. 1 shows an example of a skeleton character having projections.

FIG. 1 shows a skeleton character "7", the character positions of which are denoted by letters A, the remaining positions being denoted by dots. The character has a number of tails. These tails hardly make recognition by the human more difficult, but a machine considers all these branches as being essential characteristics. Consequently, it is advantageous to remove these tails. On the other hand, not too much is to be removed in this respect, such as the horizontal short stroke through the centre of the vertical stroke which is characteristic for a 7. In practice it appears to be advantageous to remove those tails whose length is less than approximately one-tenth of the dimensions of the character.

Figure 2:
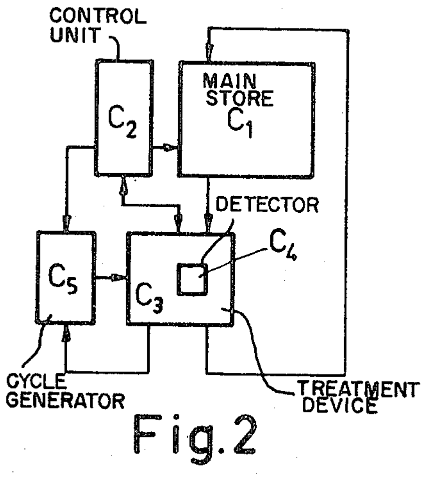
FIG. 2 shows a device (block diagram) according to the invention.

The method according to the invention can be realized, for example, in a device whose block diagram is shown in FIG. 2. The device comprises a main store C1, a control unit C2, a treatment device C3, comprising a detector C4, and a cycle generator C5. A simple embodiment is that the cycle generator C5 starts a search series of said first kind. During this search series the information of the positions stored in the main store C1 are subsequently addressed. This is possible, for example, in that the control unit C2 applies clock pulses to the main store C1 which is constructed as a shift register. The detector C4 is set for the detection of end points by a signal from the cycle generator C5. When an end point is detected, C5 receives an equality signal by which it controls a search series of said second kind. Meanwhile the information of the end point is isolated, for example, in that the information of the character position is changed into that of a back ground position, and is simultaneously stored in an isolating store, forming part of the treatment device C3, from which it can be addressed when desired.

During a search series of said second kind, the detector C4 can detect connection points and junctions in reaction to a relevant signal from C5. In this search series an interrogation is made of the neighboring positions of the character position whose information was isolated in the previous search series. If a junction is detected, the detector supplies an equality signal, which is interpreted by C5 as a first stop signal: this means that a sufficiently short tail has been found which extends from this junction to the last previously found end point. The neighbors of a connection point may include junctions as well as connection points; however, there may not be more than one connection point if there is not at least one junction. It is obvious that character positions whose information has already been isolated are not to be taken into account. After the said first stop signal the search series of said first kind is resumed without the previously isolated information still being available. In this manner, for example, all projecting stroke elements of at the most two character positions can be removed.

If no junctions are found during successive search series of said second kind, the series of character positions constitutes a real element of the investigated character. Therefore, the cycle generator C5 may comprise, for example, a counter which counts the said equality signals. When a given position is reached, for example, position 3, this counter supplies a second stop signal. After that the information of the character positions which was isolated since the previous stop signal is restored by the treatment device C3.

Figure 8:
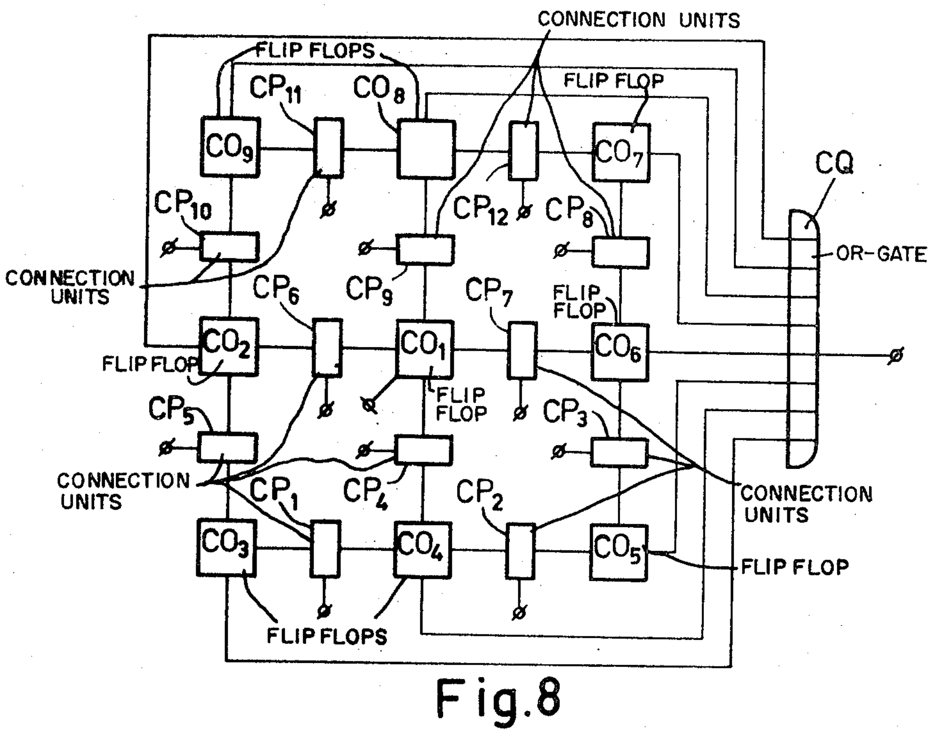
FIG. 8 shows a span length defining unit.

Another method of defining the span length in combination with a device as shown in FIG. 2, is shown in FIG. 8. The device comprises a two-dimensional shift register having 9 flipflops CO 1 . . . 9, 12 interconnection units CP1 . . . 12, and one OR-gate CQ.

This method applies to a pattern where each position has four neighbors, but can be readily modified. In this case all projecting stroke elements are removed whose ends are situated within a matrix of 3 × 3 positions with respect to the junction in the centre of this matrix. After detection of an end point the information thereof is stored in the flipflop CO1 via the input terminal thereof. If a connection point is found upon a round along the neighboring positions, a shift pulse is applied to the shift register on the base of the location thereof. If the connection point was situated at a right of the end point, the information of the end point is also shifted to the right (i.e., to flipflop CO6), while the information of the connection point is stored in CO1. This is possible in that the shift register receives a clock pulse and, in addition, the interconnection units CP2, CP7 and CP12 are activated. If another connection point is subsequently found, but now above the last connection point found, all information is shifted upwards one location as a result of a clock pulse and the activation of the interconnection units CP8, 9 and 10. The flipflops CO1, CO8 and CO7 then are in the "1" state, and the other are in the rest state. If another connection point is found, for example, again above the last connection point found, the information is again shifted upwards one location, which means that in this case two input signals of the OR-gate CQ become high: this causes a high output signal of this gate; this is the said second stop signal, which means that this projecting stroke element is too long as the span length extends outside the 3 × 3 matrix. The information of the relevant character positions is then restored, for example, in that this information appears on the outputs of the flipflops and is taken over in order to reappear in the main store in the correct location. This is possible, for example, in that the information stored in the device of FIG. 8 can be transferred in parallel form to corresponding locations in the main store.

Figure 6:
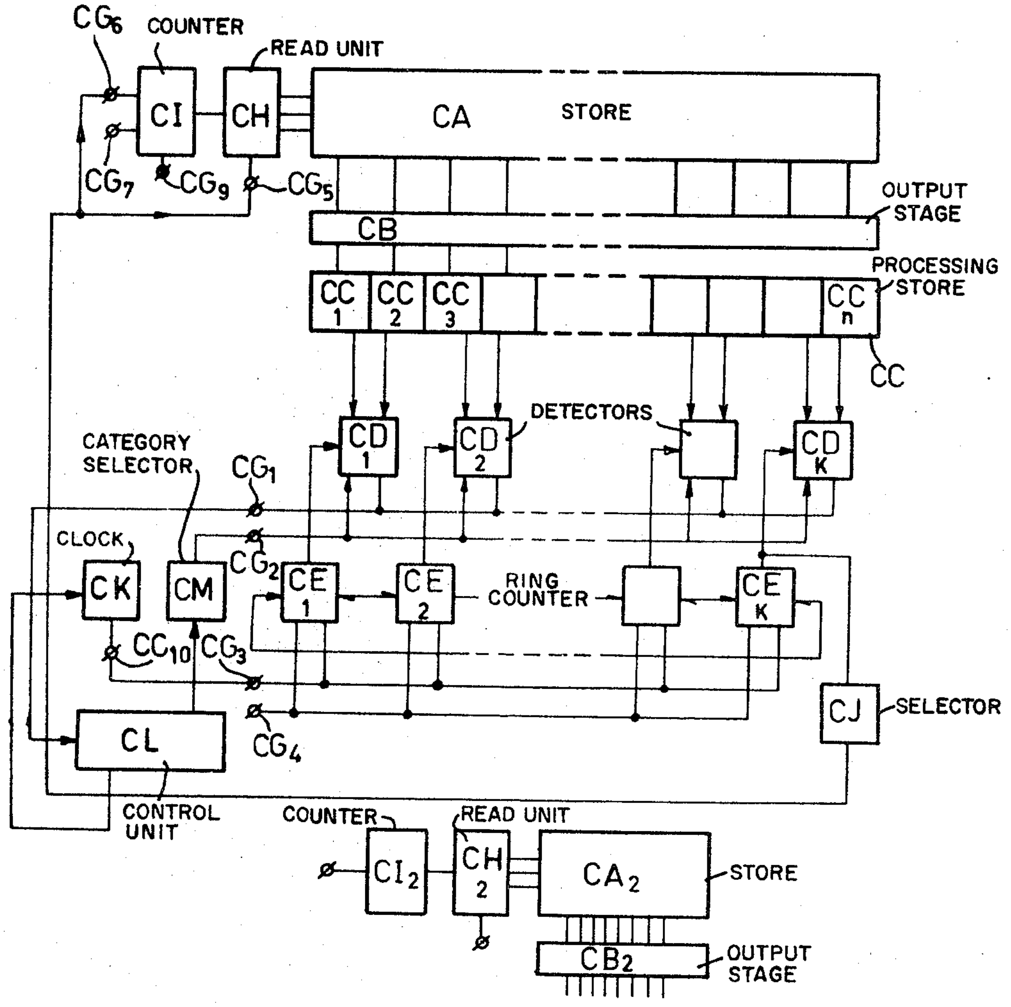
FIG. 6 shows an interrogation device.

Another embodiment according to the invention is illustrated in FIG. 6, which applies to the case of a rectangular matrix having eight neighbors per position. The information is stored as two bits, i.e., 00 is a background position, 01 is an end point, i.e., a character position having one neighbors which forms part of the skeleton character, 10 is a connection point, i.e., a character position having two neighbors, and 11 is a character position having three or more neighbors. The apparatus for indicating a character position is shown in U.S. Pat. No. 3196398 or in application Ser. No. 196,937 filed herewith.

Figure 3:
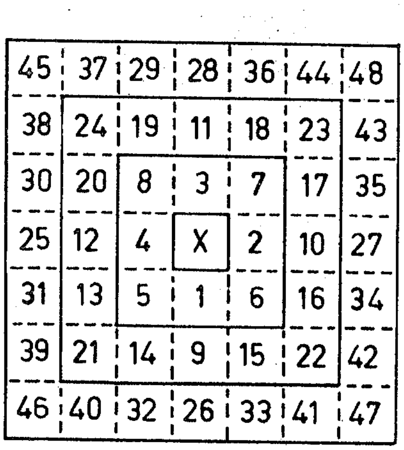
FIG. 3 shows an area which is interrogated around a junction found.

The character is scanned, for example, in that the information of the positions is successively presented to a detector. Shortening can be effected by starting from a branching point detected in the detector. If desired, a start can also be made from a position having three or more neighboring character positions, which makes no difference to the further description. If a branching point (i.e., the information 11) is found, the position is placed in the centre of a matrix in accordance with the diagram shown in FIG. 3. The positions are interrogated in the indicated sequence until the information 01, i.e., an end point, is met. If this point is found, it is removed whilst the position found is placed in the centre of the matrix shown in FIG. 3. Subsequently, the positions are interrogated in the sequence indicated there. Each time a connection point is found, it is removed and its position is placed in the centre of the matrix. After that a new search series (of the second kind) is started. It may be that the position in the centre has two connection points as neighbors during a search series of the second kind, but in that case the position in the centre also has a junction as a neighbors, and thus the above-mentioned first stop signal is produced again.

If all redundant information is also to be removed near the junction, the information can be tested against an indispensability criterion, for example, against the indispensability criterion described in U.S. Pat. application Ser. No. 196,937 which is filed simultaneously with the present application: removal of a character position may not cause an interruption in the skeleton character. After that, the search series of the first kind is continued.

When all positions of the 7 × 7 matrix have been interrogated in the search for an end point, the positions of the area in which the character is situated are further interrogated in the search for a junction.

Figure 4:
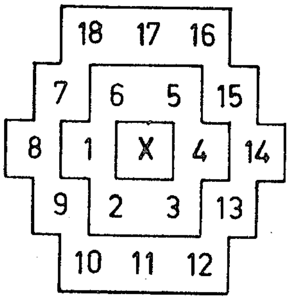
FIG. 4 shows the same in an hexagonal grid.

FIG. 4 shows the sequence in which the positions are interrogated in the search for an end point for a pattern where each position has six neighbors. The span length is determined by the dimension of the FIGS. 3 and 4; the area investigated during a search series of the first kind is limited. The short stroke elements almost always start from the nearest junction.

FIG. 6 shows the diagram of an interrogation device, said diagram comprising two stores CA and CA2, two read units CH and CH2, two counters CI and CI2, two output stages CB and CB2, one processing store CC, comprising the bistable elements CC1 . . .n, k detectors CD1 . . .k, a ring counter consisting of k bistable elements CE1 . . .k, one detector CJ, one category selector CM, one clock CK, one control unit CL, and the signal terminals CG1 . . .10. The information of all positions is stored in the store CA. If the character comprises, for example, 32 × 32 positions, the capacity of this store must be 2,048 bits. Under the control of a signal from the read unit CH, for example, each time one word can be read. The choice which word is read, is controlled by the counter CI which has a forward and a backward counting input terminal, CG6 and CG7, respectively. A word is read under the control of a signal on terminal CG5. For the sake of simplicity it is assumed that a word comprises 64 bits. If less bits are involved, for example, 32 bits, always two words per line of the character field have to be read in succession, but this does not present an essentially different solution. The information from the store is applied, via the output stage CB which comprises, for example, a number of amplifiers, to a processing store CC comprising the units CC1. . . CCn, the value of n being, for example, 64. The outputs of each two elements of this register lead to a detector, for example, those of CC1 and CC2 to the detector CD1 of the detectors CD1. . . CDk, k being one-halfn and hence, for example, 32. The elements CC1. . . are capable of supplying a signal indicating the information as well as the inverted signal thereof, so that said connections between CC1 and CD1 etc., always comprise two lines.

Also provided is a ring counter consisting of k (for example, 32) bistable elements CE1. . . CEk, one of which is always in the first position, the remaining (k − 1) being in the second position.

Only one detector is activated by the output signals of this ring counter. The ring counter also comprises two input terminals CG3 and CG4 which act as a forward and a backward counting input, respectively.

The category selection input terminal CG2 is of a triple construction and determines the category of character positions. In reaction thereto, the detectors can apply an output signal to the output terminal CG1. When the scanning of the positions of the character field is started, the ring counter CE1 . . . CEk is in the first position, and the category selector CM is set for detection of the information 11. The counter CI is in the first position and the first word, comprising, for example, the information of the upper row of positions of the character field, is read in reaction to a pulse terminal CG5. Due to the clock pulses of the clock CK on the terminal CG3, the ring counter each time counts one unit further. When the element CEk changes over from the first to the second position, the information of upper row of positions has been interrogated and a signal is applied by the detector CJ to the forward counting input of the counter CI and to terminal CG5 of the read unit CH. The next word is then read out, and the positions of the character field are thus interrogated successively. If no junctions are detected, finally the last word is read, at the end of which the counter CI applies a signal, for example, to terminal CG9, so that the termination of the character treatment is signalled and that no further short redundant stroke elements are present.

One of the detectors CD1 . . .CDk supplies an equality signal when a junction is found. This signal is applied to the clock which, consequently, applies no further signals to the terminal CG3, and to the control unit CL. The latter applies a pulse to the category selector CM, so that the latter applies the signal 01 to the detectors CD1 . . .etc., so that these detectors subsequently detect end points. Next, CL applies a signal to a counter CI2 of a second store CA2 and to the read unit CH2 thereof. In the store CA2 the words, shown in FIG. 8, consisting of eight bits, are stored. In reaction to the first pulse the first word is read. The first bit thereof relates to the direction in which the counter CI is to count, and the next three bits relate to the number of steps to be performed, and the same applies to the last four bits with reference to the ring counter CE1. . .k. Consequently, the first word gives the line counter the command: one line down, and to the ring counter the command: stay. The position which is situated directly below the position where a junction was detected is thus interrogated, and further all positions 1. . . .48 shown in FIG. 5. In this way the nearest end point is found each time found. If no end point is found among these 48 positions, the counter CI2 finally supplies a signal: the category selector is thus set to the detection of junctions, and the character field is further interrogated.

When an end point is found, an equality signal is supplied. This equality signal sets the category-selector to the position "connection point," and subsequently the first eight words are successively addressed from the store CA2. If an equality signal is then supplied by a detector, the counter CI2 receives a pulse so that it again starts to address the information stored in CA2. When an end point or a connection point is found, the information thereof is isolated. This is possible in that the information of the positions of the counter CI and the ring counter are stored in a third store not shown. When the entire character field has been interrogated, the relevant character positions are changed into background positions.

When a connection point is found, the said first stop signal is generated. The information isolated since the previous stop signal then relates to character positions which may be removed. The counter CI and the ring counter then return to the position of the last junction found, which is almost always the junction just found. Various methods can then be followed. It is possible, for example, to remove all short projecting stroke elements. However, it is alternatively possible to remove only the shortest stroke of a three-stroke junction, and to retain the longer ones: this is because the three-stroke junction is then no longer a three-stroke junction!

Figure 7:
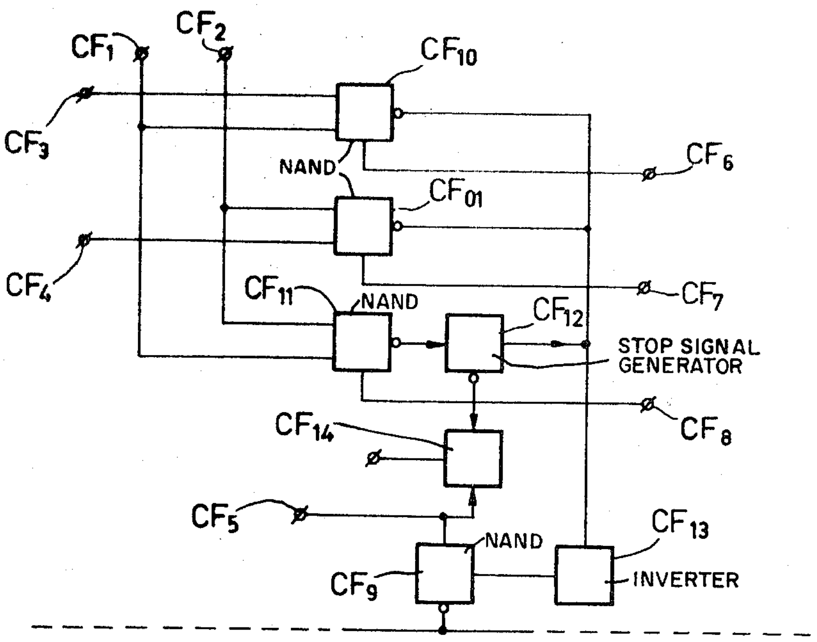
FIG. 7 shows an embodiment of a detector.

FIG. 7 shows a diagram of a detector comprising three logic NAND-gates CF10, CFO1 and CF11, nine signal terminals CF1 . . . 8 and CF4, one stop signal generator CF12, one logic NAND-gate CF9, and one inverter CF13.

The information of the position to be interrogated arrives on the terminals CF1 . . . 4, the information 00, 01, 10 and 11 denoting backround positions, end points, connection points and junctions, respectively. The information of the first of the two bits appears on the terminals CF1 and CF4. If this is a 1, the signal of terminal CF1 is high and the signal of terminal CF4 is low. If this is a 0, the signal of CF1 is low and the signal of CF4 is high. The second bit arrives on the terminals CF2 and CF3. If this is a 1, the signal of terminal CF2 is high and the signal of terminal CF3 is low, and vice versa.

The category-selector CM shown in FIG. 6 can supply a high signal on one or more of the terminals CF6, 7 or 8; in that case the relevant kind is selected. So, first only the signal of terminal CF8 is high during the search for a junction. CF5 then receives a signal from the ring counter. If the signal of CF5 is low, the output signal of CF9 is high, independent of the information of the interrogated position. If the signal of CF5 is high, and a position of the searched category is interrogated, the output signal of the associated NAND-gate, in this case CF11, becomes low, and this signal is inverted by the inverter CF13, so that the input signal of CF9 becomes high and the output signal of CF9 becomes low. This is the equality signal. The same takes place during the search for end points and connection points. If a search is made for a connection point, the search series of the second kind is to be stopped when a stop signal is detected. This is effected in that the stop signal generator CF12, receiving the output signal of CF11, applies this signal to CF14 in an inverted form. If the signal of CF is high, a high signal appears on the output of CF14. During the search for junctions (in order to search a nearby end point) the output signal of CF14 is blocked by a device not shown. During a search series of the second kind, consequently, all (in this case eight) neighboring positions are interrogated before a new search series of the second kind can be started.

Various combinations of methods can be used according to the invention. The span length can be defined in different ways; it is possible to search first for end points or first for junctions; the number of neighbors may differ from eight, and they need not all have the same order or weight; all short stroke elements can be removed or only each time the shortest stroke element starting from a junction. In this way there are many possibilities which all incorporate the advantages of the invention.

What is claimed is:

1. A device for removing short projecting stroke elements of characters which are imaged on a two-dimensional regular pattern of positions, a character position being distinguished from a background position by digital information present, additional information being provided for said character positions which indicates whether said character positions are end points, connection points or junctions, said information being stored in a store from which the information can be transferred to a treatment unit, said device comprising a treatment unit having a detector which can be adjusted, by means of an adjusting signal, for detecting end points, connection points and junctions, respectively, means to supply an equality signal upon detection of the nature of the end point, a control unit responsive to said signal for interrogating information of a number of positions, it being possible for said number to be zero, during at least one search series, means for isolating the information of an end point during a first search series by storing the end point information, means for isolating the information of a connection point during a second search series by storing the connection point information, said second search series being started when said control unit receives an equality signal during the first search series, a span length defining unit incorporated in said isolation means, and which has a capacity which is measured in a number of character positions, said defining unit supplying a signal to said control unit when the span length of a series of character positions to be found is reached, in order to prevent the starting of the subsequent second search series, said span length defining unit defining an area comprising a number of positions around a central position, the number of positions in a series which starts in said central position and which terminates near a position giving a limit of said area, always being at least equal to said span length.

2. A device for removing short projecting stroke elements of characters which are imaged on a two-dimensional regular pattern of positions, a character position being distinguished from a background position by digital information present, additional information being provided for said character positions which indicates whether said character positions are end points, connection points or junctions, said information being stored in a store from which the information can be transferred to a treatment unit, said device comprising a treatment unit having a detector which can be adjusted, by means of an adjusting signal, for detecting end points, connection points and junctions, respectively, means to supply an equality signal upon detection of the nature of the end point, a control unit responsive to said signal for interrogating information of a number of positions, it being possible for said number to be zero, during at least one search series, means for isolating the information of an end point during a first search series by storing the end point information, means for isolating the information of a connection point during a second search series by storing the connection point information, said second search series being started when said control unit receives an equality signal during the first search series, a span length defining unit incorporated in said isolation means, and which has a capacity which is measured in a number of character positions, said defining unit supplying a signal to said control unit when the span length of a series of character positions to be found is reached, in order to prevent the starting of the subsequent second search series, said span length defining unit comprising a counter which counts the number of character positions from which information has been isolated, said counter applying a signal to said control unit when a given position is reached which corresponds to a span length, in order to prevent the starting of the subsequent second search.

3. A machine method for automatically removing short projecting stroke elements of characters which are imaged on a two-dimensional regular pattern of positions, a character position being distinguished from a background position by digital information present, at least that information of said characters which determines which character positions are associated with associated skeleton characters being present, the stroke elements of said skeleton characters consisting of single series of character positions which succeed each other in accordance with an adjacency criterion, additional information being provided for said character positions which indicates whether said character positions are end points, connection points or junctions, said method comprising the steps of:

A. measuring a span length of a series of character positions starting from a junction, said span length being defined as a number of positions from an end point to said junction;
B. removing at least one series of said digital information which defines character positions depending upon whether the measured span length of that series exceeds a given value;
C. changing said additional information regarding said junction in accordance with the removal of said series, dependent upon whether said removal modifies the juncture to that of a connection point;
D. successively interrogating the positions of an area on which a skeleton character can occur;
E. detecting an end point of the series;
F. removing the character positions of the series terminating in that end point until a junction is reached, depending upon whether said span length has not been exceeded upon reaching said junction, said removal being effected in a number of successive rounds; and
G. increasing the span length by at least one position in each subsequent round.

* * * * *

PO-1050
(5/69)

UNITED STATES PATENT OFFICE
CERTIFICATE OF CORRECTION

Patent No. 3753229 Dated August 14, 1973

Inventor(s) MATTHIJS BEUN and PIETER REIJNIERSE

It is certified that error appears in the above-identified patent and that said Letters Patent are hereby corrected as shown below:

IN THE TITLE PAGE "Reinjnierse" should be --Reijnierse--

IN THE TITLE PAGE,
After "Netherlands" and before "[22]" insert
--[73] Assignee: U.S. Philips Corporation, New York, N.Y.--.

Signed and sealed this 12th day of March 1974.

(SEAL)
Attest:

EDWARD M.FLETCHER,JR.
Attesting Officer

C. MARSHALL DANN
Commissioner of Patents